Patented Dec. 17, 1929

1,740,009

UNITED STATES PATENT OFFICE

OSKAR DIENER, OF BRESLAU, GERMANY

MANUFACTURE OF TOOLS OF TUNGSTEN

No Drawing. Application filed March 20, 1928, Serial No. 263,209, and in Germany January 19, 1928.

This invention relates to hard bodies for tools of tungsten containing more than 3% carbon, and to a process for their manufacture.

It is known to manufacture tungsten bodies without additions of other metals, from tungsten previously melted with coal, the molten metal being broken up finely, pressed at room temperature into carbon moulds and thereupon sintered at high temperatures in the neighbourhood of the point of fusion. As the raw material has been melted, its chemical composition corresponds to the formula $W_2C$, that is to say the material contains 3% carbon.

It is further known to manufacture tungsten bodies with a high proportion of carbon by the addition of auxiliary metals. A considerable percentage of the total material is always formed by the auxiliary metals.

On the contrary, the object of this invention is to use the purest possible tungsten, with more than 3% combined carbon for tools, as such tungsten has particularly the desired great degree of hardness.

The chief difficulties in the treatment of tungsten with a high proportion of carbon exceeding 3%, consisted up to now in the necessity of using, for the treatment without auxiliary metal, high temperatures over 1600° C. At such temperatures the carbon over 3%, even when it had been dissolved in sufficient quantities, separates in the form of graphite during the sintering or melting. Even with rapid cooling it is impossible materially to increase this limit.

This difficulty of obtaining carbon in a combined state with tungsten, is eliminated by the present process. It consists in pouring tungsten powder with a high proportion of carbon, manufactured in the known manner and containing the carbon in a combined state, into highly refractory press moulds, and quickly heating it to about 2000° C.; a mechanical pressure of about 150-200 kg. per sq. cm. being exerted on the contents of the mould, during the heating, by means of press dies. Owing to the high pressure and to the high temperature, the limit of flow is exceeded, and the material is compressed to an extraordinarily dense body. The finished body, owing to the action of the pressure, does not show any graphite separation on cooling, has quite an extraordinary hardness and takes an excellent polish.

It has been stated already that even small quantities of auxiliary metal of a few percent are liable to reduce the hardness considerably. On the other hand, an addition of substances which become alloyed with tungsten, facilitates the process of pressing. In order to obtain a body of the greatest possible hardness with a high percentage of combined carbon without any loss of hardness, and simultaneously to facilitate the process of pressing, it has been found advisable to use, as additions, small traces of boron or silicon, which have the property of increasing the hardness. The temperature of pressing is then lowered by more than 100° C. Boron is preferably added in the form of boracic acid, namely 0.65% corresponding to 0.2% of pure boron, silicon in the form of fine powder, that is, also 0.2%. The highest quantity of boron used must not exceed 0.6%, and that of silicon 1.5%, as with the use of greater quantities, the mechanical properties of the hard bodies considerably deteriorate.

What I claim is:

1. Process for the manufacture of tools from tungsten containing more than 3% of combined carbon, which comprises highly heating the powdered carbon-containing tungsten up to about 2000° C. and simultaneously forming it under a high reaction pressure up to about 150 to 200 kilos per square cm. so that the separation of the combined carbon is prevented.

2. Process according to claim 1, which comprises adding boron up to about 0.6 percent to the powdered mass.

3. Process according to claim 1, which comprises adding silicon up to about 1.5 percent to the powdered mass.

4. Process according to claim 1, which comprises adding boron-containing materials up to about 0.6 percent to the powdered mass.

5. Process according to claim 1, which comprises adding silicious materials up to 1.5 percent to the powdered mass.

In testimony whereof, I affix my signature.

OSKAR DIENER.